US008917882B2

(12) United States Patent
Miao et al.

(10) Patent No.: US 8,917,882 B2
(45) Date of Patent: Dec. 23, 2014

(54) HEADSET SWITCHES WITH CROSSTALK REDUCTION

(75) Inventors: Guoqing Miao, San Diego, CA (US); Peter J. Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 13/570,068

(22) Filed: Aug. 8, 2012

(65) Prior Publication Data

US 2013/0266146 A1 Oct. 10, 2013

Related U.S. Application Data

(60) Provisional application No. 61/621,266, filed on Apr. 6, 2012.

(51) Int. Cl.
*H04B 3/00* (2006.01)
*H04R 1/10* (2006.01)

(52) U.S. Cl.
USPC .................. 381/77; 381/28; 381/58; 381/74; 381/123; 381/384

(58) Field of Classification Search
USPC .................. 381/28, 58, 74, 77, 122, 123, 384
See application file for complete search history.

(56) References Cited

U.S. PATENT DOCUMENTS

| | | | | |
|---|---|---|---|---|
| 6,856,046 | B1 | 2/2005 | Scarlett et al. | |
| 7,450,726 | B2 | 11/2008 | Goyal | |
| 7,912,501 | B2 | 3/2011 | Johnson et al. | |
| 8,133,073 | B2 | 3/2012 | Buchberger et al. | |
| 8,150,046 | B2 | 4/2012 | Hansson et al. | |
| 2010/0215183 | A1 * | 8/2010 | Hansson et al. | 381/58 |
| 2011/0268289 | A1 | 11/2011 | Baranwal et al. | |

FOREIGN PATENT DOCUMENTS

| | | | |
|---|---|---|---|
| WO | 2011079720 | A1 | 7/2011 |

OTHER PUBLICATIONS

International Search Report and Written Opinion—PCT/U S2013/035522—ISA/EPO—May 31, 2013.

* cited by examiner

*Primary Examiner* — Paul S Kim
(74) *Attorney, Agent, or Firm* — James Gutierrez

(57) ABSTRACT

Techniques for utilizing a plurality of switches to reduce crosstalk in a headset jack for accommodating both European and North American type headset plugs. In an aspect, a six-switch solution is provided to selectively couple first and second terminals of the jack to a ground and a microphone terminal, and further to selectively couple a ground sensing input to the first or second terminal of the jack. The ground sensing input is provided to left and right audio channel amplifiers for driving the corresponding left and right terminals of the headset, to provide a common-mode reference level to the left and right audio channel amplifiers. In another aspect, at least four physical pins are provided to couple the switches to the ground and microphone terminals of the jack, and the connections between the ground sensing inputs and the jack may be provided adjacent to the jack for better isolation.

20 Claims, 12 Drawing Sheets

HEADSET SWITCHES WITH CROSSTALK REDUCTION

RELATED APPLICATIONS

This application claims priority to U.S. Provisional Pat. App. No. 61/621,266, entitled "Low Crosstalk Headset Jack Microphone and Ground Line Switch," filed Apr. 6, 2012, the contents of which are hereby incorporated by reference in their entirety.

BACKGROUND

1. Field

The disclosure relates to media devices, and, in particular, to techniques for reducing crosstalk caused by microphone and ground switches in an audio headset.

2. Background

Audio and other media devices often include a jack for receiving a media plug coupled to a peripheral device. For example, a mobile phone may include a jack for receiving a plug coupled to an audio headset with microphone, which allows a user to carry on a voice conversation over the mobile phone using the headset. Other example media devices include MP3 players, handheld gaming devices, tablets, personal computers, notebook computers, personal digital assistants, etc., while other peripheral devices include headphones, hearing-aid devices, personal computer speakers, home entertainment stereo speakers, etc.

A media device may be configured to accommodate different types of plugs, for example, a European type or a North American type. Depending on the detected plug type, a plurality of switches in the media device may be selectively enabled or disabled to couple terminals of the plug to the appropriate processing nodes in the media device. In particular implementations, certain of the switches designed to couple a plug terminal to a ground voltage may introduce significant on-resistance between the plug terminal and ground, which may undesirably lead to crosstalk between the left and right audio channels of the headphone. To reduce such crosstalk, the switches may be made larger in size. However, such a solution would undesirably consume chip and/or board area.

It would be desirable to provide simple and efficient techniques to reduce crosstalk in headset channels arising from switches for accommodating multiple media plug types.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
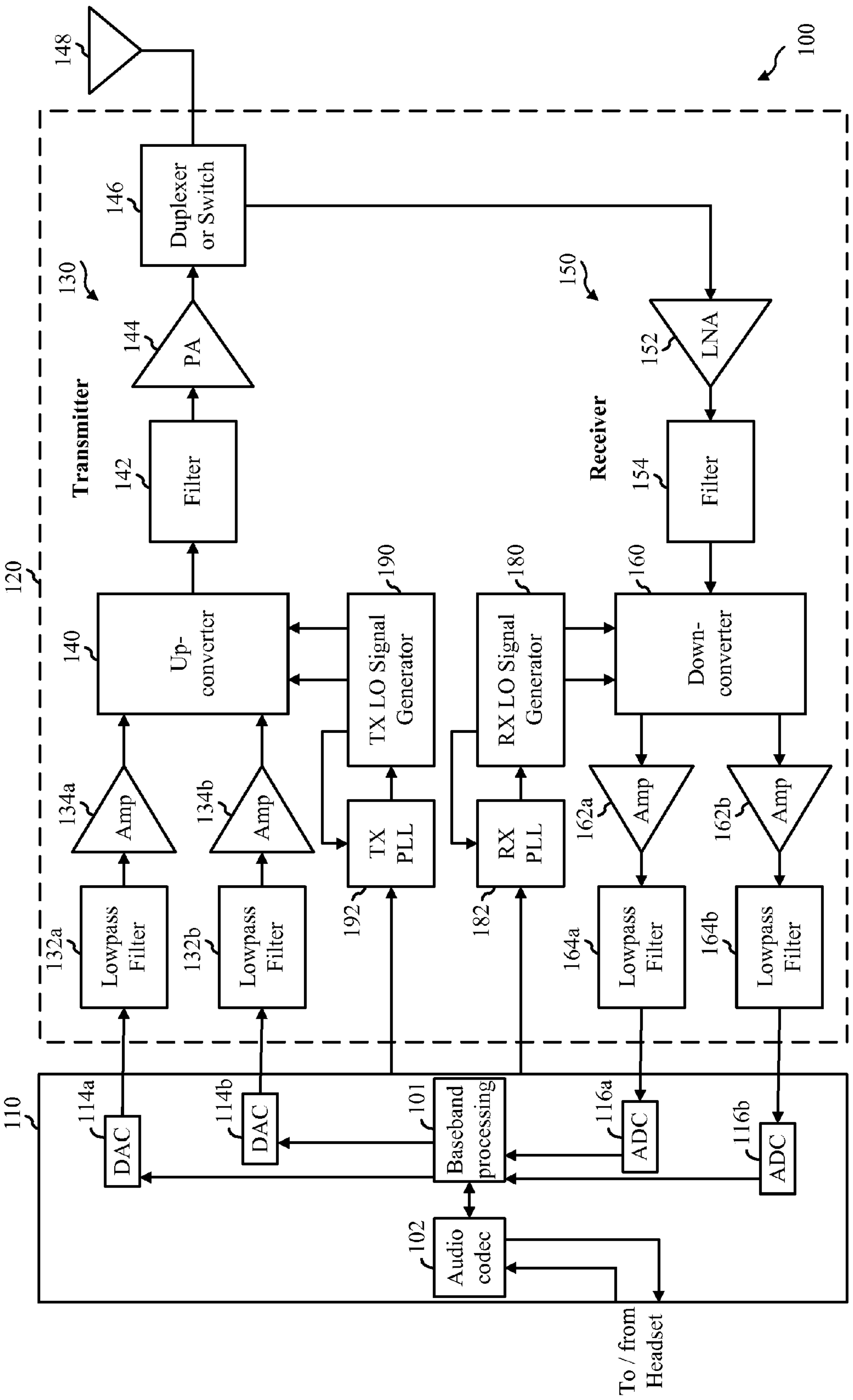
FIG. 1 illustrates a block diagram of a design of a wireless communication device in which the techniques of the present disclosure may be implemented.

FIG. 1 illustrates a block diagram of a design of a wireless communication device 100 in which the techniques of the present disclosure may be implemented. FIG. 1 shows an example transceiver design. In general, the conditioning of the signals in a transmitter and a receiver may be performed by one or more stages of amplifier, filter, upconverter, downconverter, etc. These circuit blocks may be arranged differently from the configuration shown in FIG. 1. Furthermore, other circuit blocks not shown in FIG. 1 may also be used to condition the signals in the transmitter and receiver. Some circuit blocks in FIG. 1 may also be omitted.

In the design shown in FIG. 1, wireless device 100 includes a transceiver 120 and a data processor 110. The data processor 110 may include a memory (not shown) to store data and program codes. Transceiver 120 includes a transmitter 130 and a receiver 150 that support bi-directional communication. In general, wireless device 100 may include any number of transmitters and any number of receivers for any number of communication systems and frequency bands. All or a portion of transceiver 120 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the design shown in FIG. 1, transmitter 130 and receiver 150 are implemented with the direct-conversion architecture.

In the transmit path, data processor 110 processes data to be transmitted and provides I and Q analog output signals to transmitter 130. In the exemplary embodiment shown, the data processor 110 includes digital-to-analog-converters (DAC's) 114*a* and 114*b* for converting digital signals generated by the data processor 110 into the I and Q analog output signals, e.g., I and Q output currents, for further processing.

Within transmitter 130, lowpass filters 132*a* and 132*b* filter the I and Q analog output signals, respectively, to remove undesired images caused by the prior digital-to-analog conversion. Amplifiers (Amp) 134*a* and 134*b* amplify the signals from lowpass filters 132*a* and 132*b*, respectively, and provide I and Q baseband signals. An upconverter 140 upconverts the I and Q baseband signals with I and Q transmit (TX) local oscillating (LO) signals from a TX LO signal generator 190 and provides an upconverted signal. A filter 142 filters the upconverted signal to remove undesired images caused by the frequency upconversion as well as noise in a receive frequency band. A power amplifier (PA) 144 amplifies the signal from filter 142 to obtain the desired output power level and provides a transmit RF signal. The transmit RF signal is routed through a duplexer or switch 146 and transmitted via an antenna 148.

In the receive path, antenna 148 receives signals transmitted by base stations and provides a received RF signal, which is routed through duplexer or switch 146 and provided to a low noise amplifier (LNA) 152. The received RF signal is amplified by LNA 152 and filtered by a filter 154 to obtain a desirable RF input signal. A downconverter 160 downconverts the RF input signal with I and Q receive (RX) LO signals from an RX LO signal generator 180 and provides I and Q baseband signals. The I and Q baseband signals are amplified by amplifiers 162*a* and 162*b* and further filtered by lowpass filters 164*a* and 164*b* to obtain I and Q analog input signals, which are provided to data processor 110. In the exemplary embodiment shown, the data processor 110 includes analog-to-digital-converters (ADC's) 116*a* and 116*b* for converting the analog input signals into digital signals to be further processed by the data processor 110.

TX LO signal generator 190 generates the I and Q TX LO signals used for frequency upconversion. RX LO signal generator 180 generates the I and Q RX LO signals used for frequency downconversion. Each LO signal is a periodic signal with a particular fundamental frequency. A PLL 192 receives timing information from data processor 110 and generates a control signal used to adjust the frequency and/or phase of the TX LO signals from LO signal generator 190. Similarly, a PLL 182 receives timing information from data processor 110 and generates a control signal used to adjust the frequency and/or phase of the RX LO signals from LO signal generator 180.

The data processor 110 further includes a baseband processing module 101 configured to process RX data from the ADC's 116*a*, 116*b*, and further to process TX data to the DAC's 114*a*, 114*b*. The baseband processing module 101 is further coupled to an audio codec 102. The module 101 may transmit digital signals to the audio codec 102 for output as an analog audio signal, and may further receive digital signals from the audio codec 102 corresponding to audio input signals. The audio codec 102 may further interface with audio signals to and from a headset (not shown in FIG. 1). In an exemplary embodiment, the techniques of the present disclosure may be implemented, e.g., using switches integrated on the data processor 110 with the audio codec 102, or using switches that are external to the data processor 110.

Figure 2:
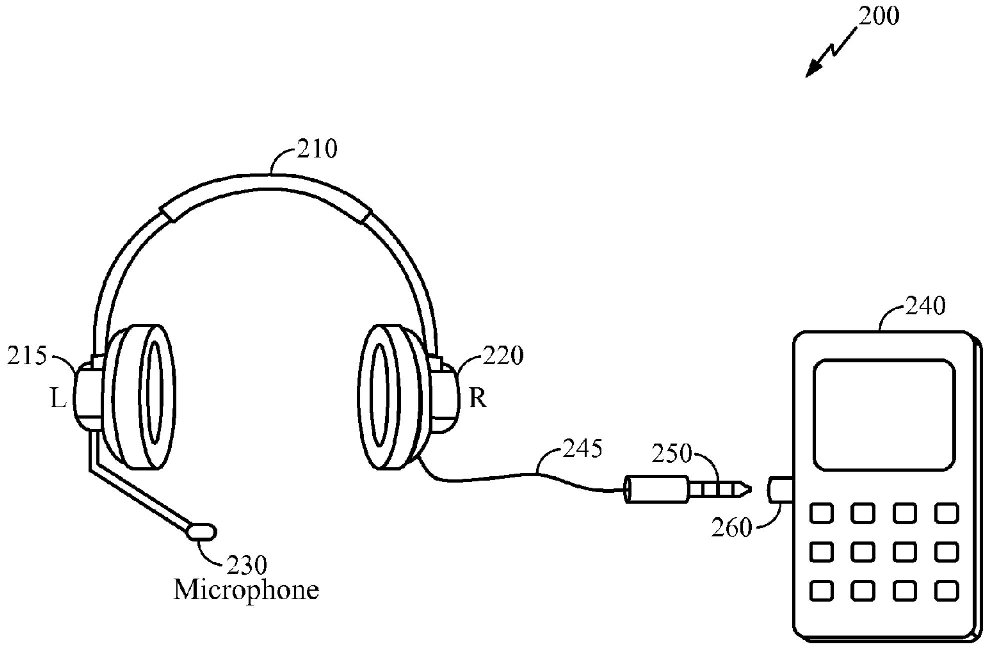
FIG. 2 illustrates an exemplary scenario wherein the techniques of the present disclosure may be applied.

FIG. 2 illustrates an exemplary scenario 200 wherein the techniques of the present disclosure may be applied. It will be appreciated that FIG. 2 is shown for illustrative purposes only, and is not meant to limit the scope of the present disclosure to the particular system shown. For example, it will be appreciated that the techniques disclosed herein may also be readily applied to audio devices other than that shown in FIG. 2. Furthermore, the techniques may also be readily adapted to other types of multi-media devices, as well as to non-audio media devices, e.g., to reduce crosstalk in plugs supporting video, etc. Such alternative exemplary embodiments are contemplated to be within the scope of the present disclosure.

In FIG. 2, a headset 210 includes a left (L) headphone 215, a right (R) headphone 220, and a microphone 230. These components of the headset 210 are electrically coupled to terminals of a plug 250 via conducting wires 245. The plug 250 is insertable into a jack 260 of a media device 240. Note the jack 260 need not extrude from the surface of the device 240 as suggested by FIG. 2, and furthermore, the sizes of the elements shown in FIG. 2 are not necessarily drawn to scale. The device 240 may be a mobile phone incorporating the circuitry shown in FIG. 1. The device 240 may also be, e.g., an MP3 player, home stereo system, etc. Audio and/or other signals may be exchanged between the device 240 and the headset 210 through the plug 250 and jack 260. The plug 250 receives the audio signals from the jack 260, and routes the signals to the L and R headphones of the headset 210. The plug 250 may further couple an electrical signal with audio content generated by the microphone 230 to the jack 260, and the microphone signal may be further processed by the device 240. Note the plug 250 may include further terminals not shown, e.g., for communicating other types of signals such as control signals, video signals, etc.

Figure 3:
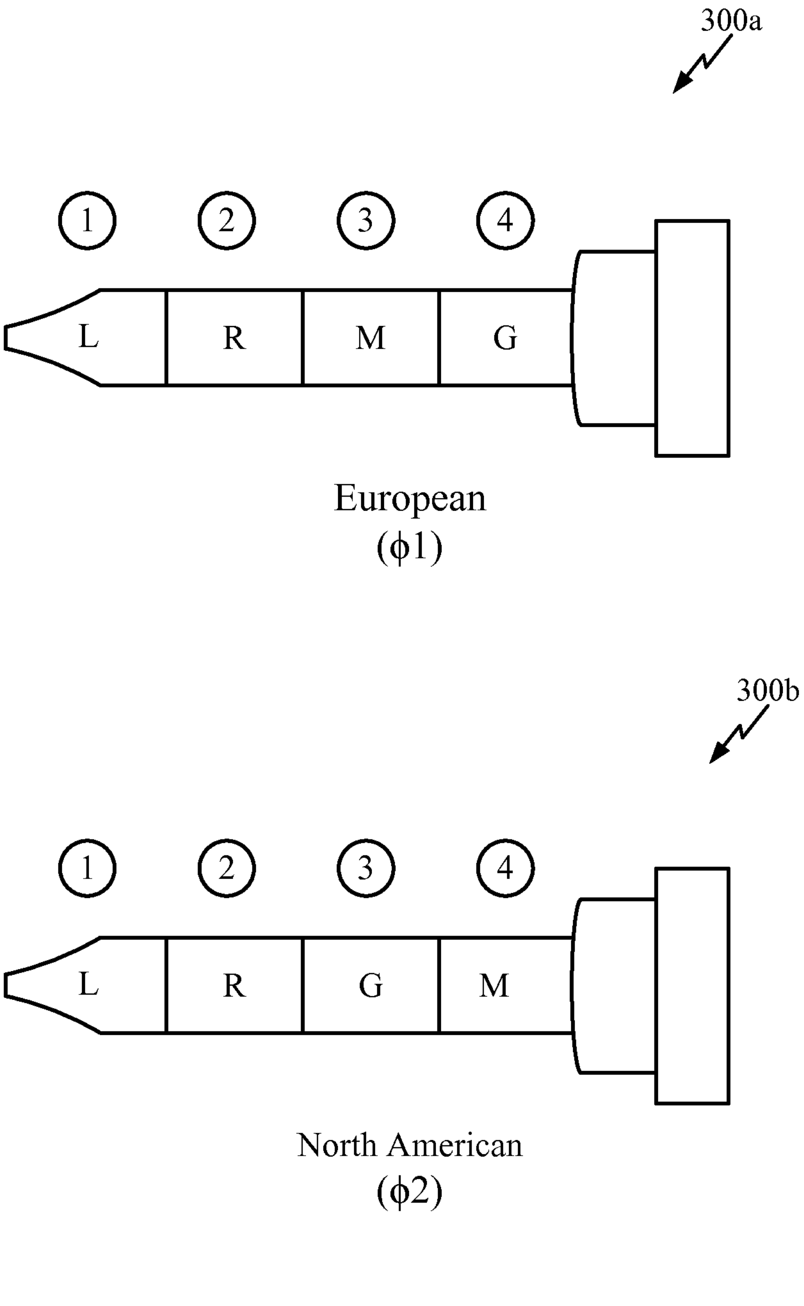
FIG. 3 illustrates the sequence of terminals on a plug that may generally be provided according to either a European or a North American type plug layout.

The sequence of terminals on plug 250 may generally be provided according to one of several types of common standardized layouts, as shown in FIG. 3. For example, according to a European type plug layout 300*a*, the terminals may be ordered as left audio (L), right audio (R), microphone (M), and ground (G), as enumerated from the tip of the plug to the base of the plug. On the other hand, according to a North American type plug layout 300*b*, the terminals may be ordered as left audio (L), right audio (R), ground (G), and microphone (M). Upon insertion into a jack, the terminals of both types of plugs may be electrically coupled to corresponding jack terminals 1, 2, 3, and 4, respectively, from tip to base, as indicated by the circled numerals in FIG. 3.

To accommodate both North American and European plug types using a single jack, a device 240 may generally incorporate switching circuitry to electrically route the plug terminals to the appropriate jack terminals, depending on the type of plug inserted. For example, a plurality of switches may be provided at the device 240 to electrically couple terminals (M) and (G) of a European type plug to terminals 3 and 4 of a jack, respectively, or alternatively, to couple terminals (G) and (M) of a North American type plug to terminals 3 and 4 of a jack, respectively. In an implementation, the device 240 may include a codec chip (not shown) on which the drivers (e.g., amplifiers) for the left (L) and right (R) audio channels may be provided, and the switching circuitry may be integrated with the codec chip, or they may be external to the codec chip.

Note the designation of certain jack terminals in FIG. 3 as terminals 1, 2, 3, and 4 is for illustrative purposes only. It will be appreciated that alternative denotations of the jack terminals may readily be employed. Further note that, in this specification and the claims, the term "a first terminal" of a jack may denote, e.g., any of jack terminals 1, 2, 3, and 4 shown in FIG. 3, while the term "a second terminal" of a jack may denote, e.g., any of jack terminals 1, 2, 3, and 4 distinct from the "first terminal" In general, unless otherwise noted, the use of the terms "first," "second," etc., herein is for identification purposes only, and need not imply that, e.g., a "first" element necessarily precedes a "second" element in sequence.

Figure 4:
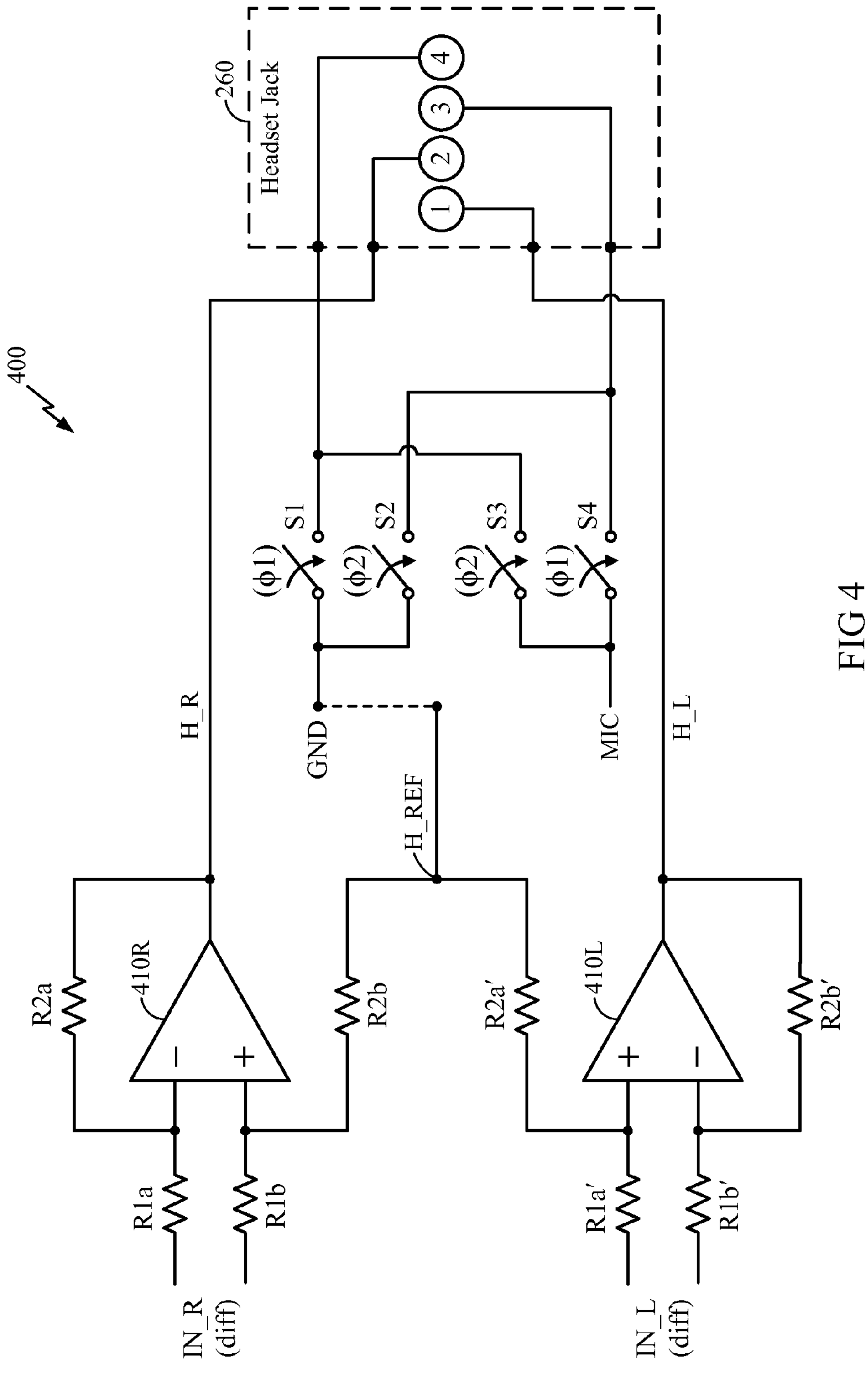
FIG. 4 illustrates a prior art implementation of an electrical system, e.g., provided on a media device, for driving jack terminals 1 through 4, wherein a plurality of switches are provided to accommodate both North American and European type plugs.

FIG. 4 illustrates a prior art implementation of an electrical system 400, e.g., provided on a device 240, for driving jack terminals 1 through 4, wherein a plurality of switches are provided to accommodate both North American and European type plugs. In FIG. 4, an amplifier 410R is configured with resistors R1*a*, R1*b*, R2*a*, R2*b* for generating a right headphone signal (H_R) for driving terminal 2 of the jack. It will be appreciated from the circuit topology shown that the H_R signal will correspond to an amplified version of a differential (diff) right-channel input signal IN_R. FIG. 4 further illustrates an amplifier 410L configured with resistors R1*a*', R1*b*', R2*a*', R2*b*' for generating a left headphone signal (H_L) for driving terminal 1 of the jack. The H_L signal will also correspond to an amplified version of a differential (diff) left-channel input signal IN_L. Note the configuration of resistors in FIG. 4 is shown for illustrative purposes only, and it is contemplated that alternative exemplary embodiments may incorporate other amplifier configurations for driving the left and right audio channels, e.g., amplifiers having different types of feedback or passive elements than shown in FIG. 4.

In the implementation shown, resistors R2*b* and R2*a*' are coupled at a single node labeled H_REF, which is in turn coupled to the ground (GND) voltage. H_REF may also be denoted the "reference terminal" or "ground sensing input" or "ground sensing terminal" It will be appreciated that H_REF may be understood to provide a common-mode reference to the differential amplifiers 410R and 410L. For example, to reduce common-mode ground noise that may be present at the jack ground terminal and at the board level, H_REF may be connected directly to the jack ground terminal to remove the ground noise.

In FIG. 4, a plurality of switches S1, S2, S3, and S4 is further provided to alternately couple the ground (GND) and microphone (MIC) nodes of the system 400 to the appropriate terminals of the jack 260, depending on the inserted plug type. In particular, if an inserted plug type is European, then switches S1 and S4 will be closed (according to a Φ1 configuration of the switches), and switches S2 and S3 will be open. Alternatively, if the inserted plug type is North American, then switches S2 and S3 will be closed (according to a Φ2 configuration of the switches), and switches S1 and S4 will be open. In this manner, the GND and MIC nodes of the system 400 may be appropriately routed to the terminals of the jack 260 through the action of the switches S1-S4.

Figure 5:
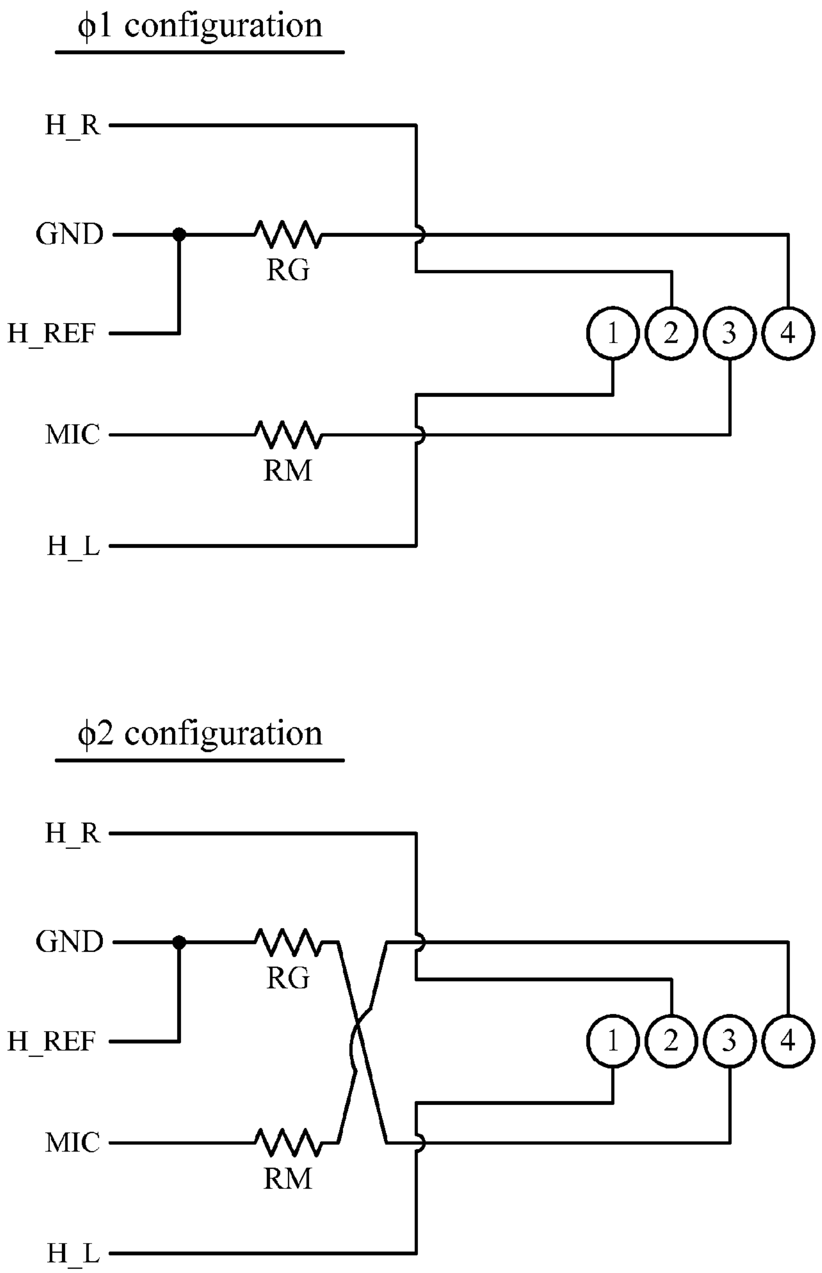
FIG. 5 illustrates equivalent circuits of the Φ1 and Φ2 configurations of the switches.

One disadvantage of the system 400 is that a certain degree of crosstalk may be present between the right and left audio channels H_R and H_L, due to finite on-resistance of either of the ground switches S1 or S2. In particular, as shown in FIG. 5, according to either the Φ1 of Φ2 configuration of switches, there will be a resistance RG between the jack terminal and the system ground voltage, and a resistance RM between the jack terminal and the microphone node, wherein RG corresponds to the on-resistance of either switch S1 or S2, while RM corresponds to the on-resistance of either switch S3 or S4. As the H_R and H_L headset channels share a common path to ground (GND), the ground switch on-resistance RG will generate a crosstalk component between the right and left headphone channels. In particular, a component in the left audio signal H_L will be present in the right audio signal H_R, and vice versa, due to the varying voltage across the common ground switch resistance RG. For example, a 16-Ohm switch resistance can create approximately −60 dB of crosstalk when coupled with a 16-milliOhm headset. Such crosstalk undesirably degrades the signal fidelity of the left and right audio channels.

Note the amount of crosstalk in the system may be quantified as follows (Equation 1):

$$\text{Crosstalk} = \frac{RG}{RF + 2 \times RG};$$

wherein RL represents the resistance corresponding to the left or right audio load. Per Equation 1, the larger the ground switch resistance RG, the larger the crosstalk component will be. Thus to reduce this crosstalk component, the switches S1 and S2 may be made larger in size to reduce their turn-on resistance. However, this may undesirably consume a great deal of silicon chip area, and is not an ideal solution for integrated systems, wherein chip area is at a premium. It would thus be desirable to provide simple and efficient techniques to reduce the amount of crosstalk in an audio system.

Figure 6:
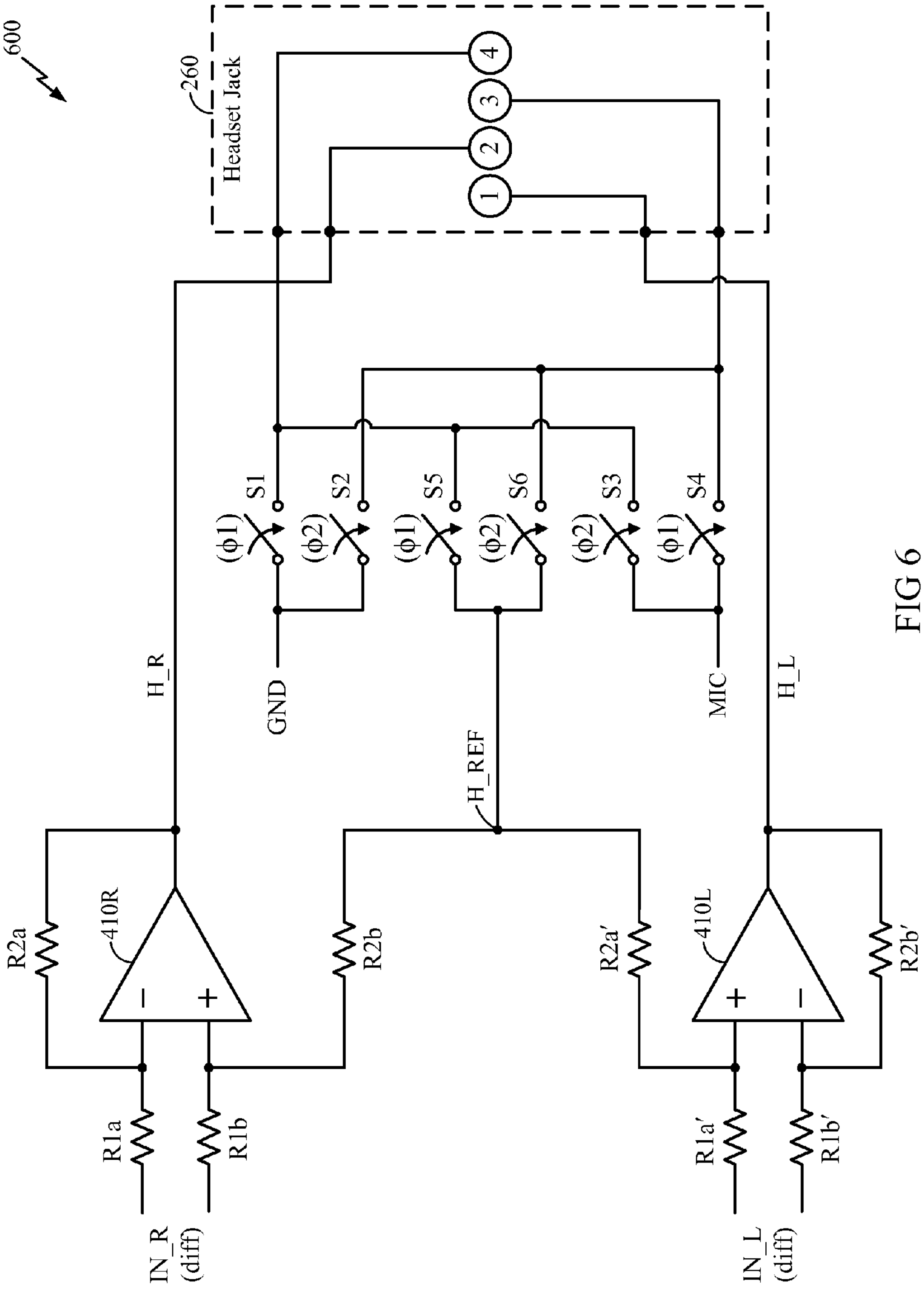
FIG. 6 illustrates an exemplary embodiment of the present disclosure, wherein a six-switch solution is provided to reduce crosstalk in an audio system.

FIG. 6 illustrates an exemplary embodiment of the present disclosure, wherein a six-switch solution is provided to reduce the aforementioned crosstalk. Note certain aspects of FIG. 6 are shown for illustrative purposes only, and are not meant to limit the scope of the present disclosure to the specific embodiment shown. Furthermore, certain elements may be similarly labeled in FIGS. 4 and 6, and such elements may be understood as performing similar functionality, unless otherwise noted.

In FIG. 6, switches S5 and S6 are provided in the audio system, in addition to the switches S1-S4. S5 and S6 are configured to always couple the ground sensing input H_REF to the ground terminal of the jack 260, regardless of whether the plug type is North American or European. In this manner, any voltage drops caused by RG may be sampled by H_REF and fed back to the audio amplifiers as common-mode ground noise. In particular, per the Φ1 configuration, corresponding to the inserted plug type being European, S5 couples H_REF to terminal 4 of the jack 260. Alternatively, per the Φ2 configuration, corresponding to the inserted plug type being North American, S6 couples H_REF to terminal 3 of the jack 260.

Figure 7:
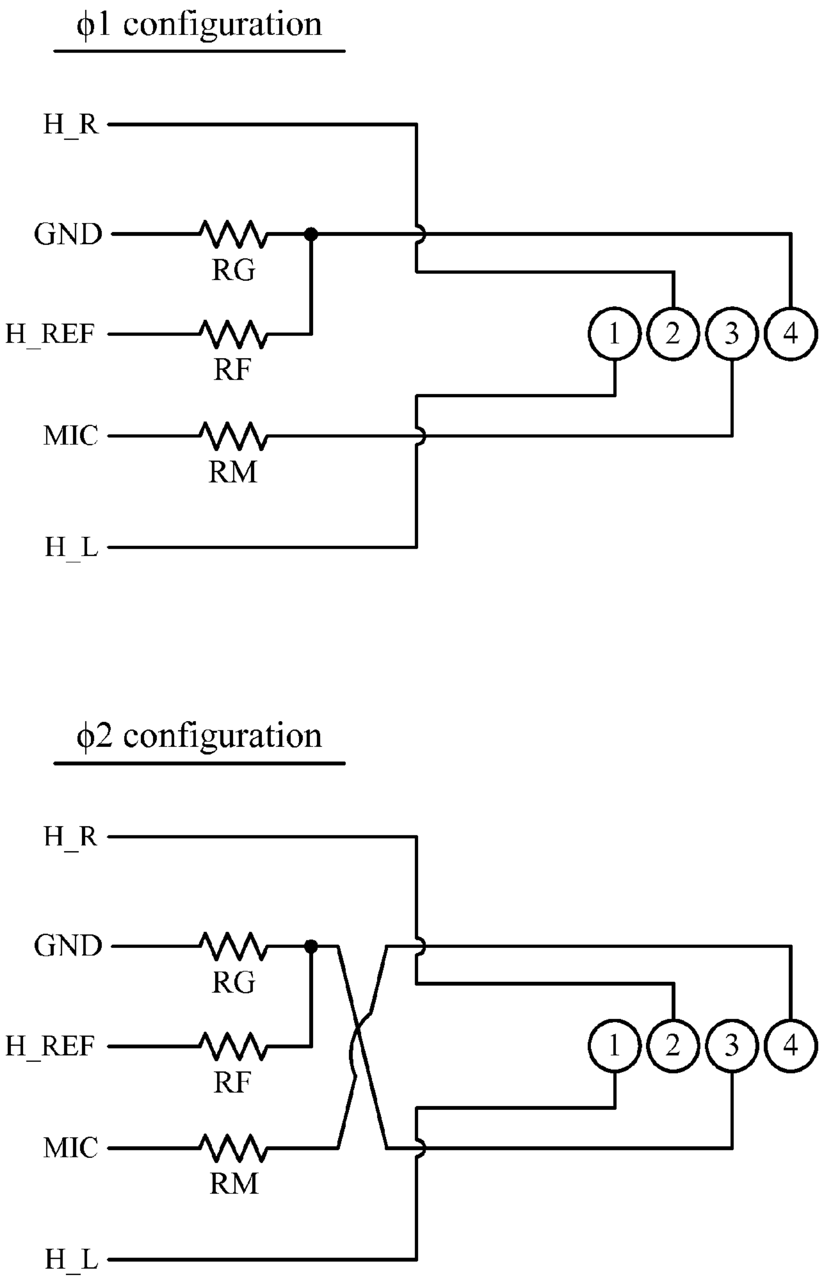
FIG. 7 illustrates electrical connections of the system 500 according to both the Φ1 and Φ2 configurations of the switches.

FIG. 7 illustrates electrical connections of the system 600 according to both the Φ1 and Φ2 configurations of the switches. In particular, as shown in FIG. 7, according to either the Φ1 or Φ2 configuration, the reference node H_REF is configured to sample the voltage across RG via a resistance RF, which may correspond to the on-resistance of the switch S5 or S6. As the voltage across RG is fed back to the amplifiers 410R and 410L as common-mode ground noise, it is expected that the crosstalk will be significantly reduced in the system 600 compared to the system 400.

In particular, the amount of crosstalk in the system 600 may be quantified as follows (Equation 2):

$$\text{Crosstalk} = \frac{R1 \times RF}{2 \times R2 \times (R1 + R2 + 2 \times RF)};$$

wherein it is assumed that R1=R1*a*=R1*a*', and R2=R2*a*=R2*a*'. In an exemplary embodiment, RF may be on the order of a few Ohms, while the resistors R1*a*, R2*a*, Rib, R2*b*, R1*a*', R2*a*', R1*b*', R2*b*' may all be on the order of kiloOhms Therefore, any crosstalk contributed by RF is not expected to be significant. Furthermore, in an exemplary embodiment, any crosstalk contributed by RF can be further reduced by using integrated circuit layout techniques to match the resistances in the amplifier (410R and 410L) feedback paths to each other.

Figure 8:
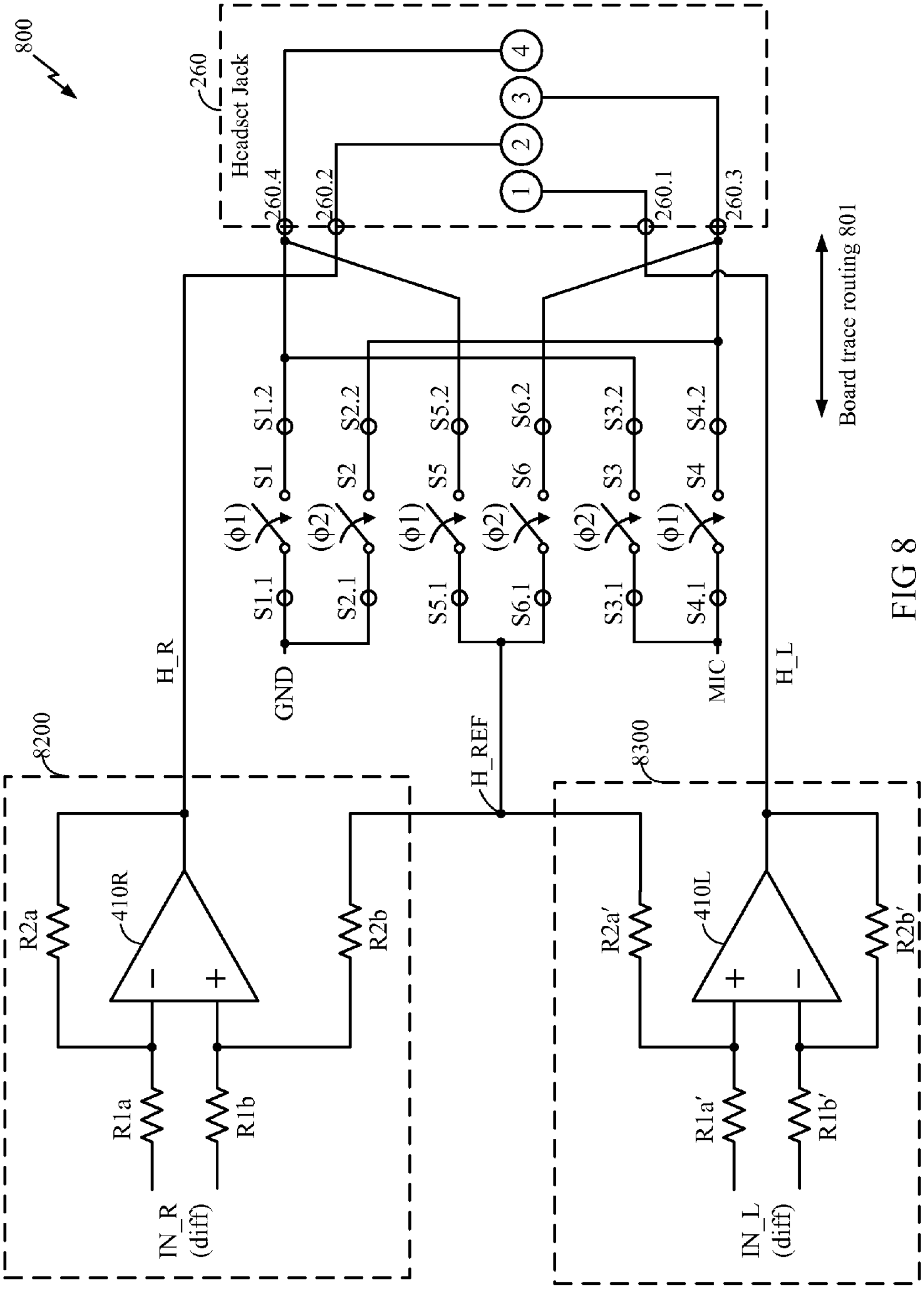
FIG. 8 illustrates an exemplary embodiment of the present disclosure, wherein the six switches S1-S6 are provided in discrete form.

FIG. 8 illustrates an exemplary embodiment of the present disclosure, wherein the six switches S1-S6 are provided in discrete form, i.e., separately from an integrated circuit housing the right channel amplifier 8200 and left channel amplifier 8300. In FIG. 8, each of the switches S1-S6 is associated with two corresponding pins, corresponding to the switch terminals. For example, S1 has two pins S1.1, S1.2, while S2 has two pins S2.1, S2.2, etc. The pins may correspond to, e.g., physical pins of a discrete integrated circuit housing the corresponding switch or switches. In certain exemplary embodiments, all six of the switches S1-S6 may be provided on a single discrete integrated circuit, with twelve physical pins provided for interfacing the switches with other board-level elements. In alternative exemplary embodiments, any subset of the switches S1-S6 may be provided on single discrete integrated circuits, with a total of twelve physical pins provided across all the discrete integrated circuits housing the switches.

In FIG. 8, the headset jack 260 is further shown with four physical terminals 260.1, 260.2, 260.3, and 260.4, which are electrically coupled to the corresponding terminals 1, 2, 3, and 4 of the jack 260, as earlier described hereinabove. It will be appreciated that the pins S1.2, S2.2, S3.2, S4.2, S5.2, and S6.2, representing the outputs of the switches S1-S6, may be routed to corresponding physical terminals 260.1, 260.2, 260.3, 260.4 using board trace routing 801, i.e., conductive electrical leads that are provided on a physical board on which the switches S1-S6, the jack 260, as well as an integrated circuit housing amplifiers 8200, 8300 may be provided.

In particular, note that S1.2 and S3.2 are electrically coupled, and similarly, S2.2 and S4.2 are electrically coupled. Furthermore, the output of pin S5.2 is electrically coupled to physical terminal 260.4 of the jack 260. In an exemplary embodiment, the electrical connection between S5.2 and 160.4 may be provided as close to 260.4 as possible, i.e., in close physical proximity to the jack 160. Similarly, the output of pin S6.2 is electrically coupled to physical terminal 260.3 of the jack 260, and the electrical connection between S6.2 and 260.3 may be provided as close to 260.3 as possible.

It will be appreciated that, in this manner, the electrical connection between pin S5.2 and terminal 260.4 is effectively independent of the electrical connection between pins S1.2, S3.2 and terminal 260.4, since the two electrical connections are routed over separate conductive paths on the board. In particular, during Φ1, the parasitic routing resistance between S1.2, S3.2 and jack terminal 260.4 can be modeled as being part of the ground resistance RG, and the parasitic routing resistance between S5.2 and 260.4 can be modeled as being part of the ground sensing path resistance RF. Similarly, the electrical connection between pin S6.2 and terminal 260.3 is effectively independent of the electrical connection between pins S2.2, S4.2 and terminal 260.3. In particular, during Φ2, the parasitic routing resistance between S2.2, S4.2 and jack terminal 260.3 can be modeled as being part of the ground resistance RG, and the parasitic routing resistance between S6.2 and 260.3 can be modeled as being part of the ground sensing path resistance RF.

It will be appreciated that maintaining such independence between the ground path and the H-REF path to the jack advantageously separates any parasitic resistances due to implementing the conductive paths as physical board traces, and thus further improves the crosstalk reduction features described herein.

Figure 9:
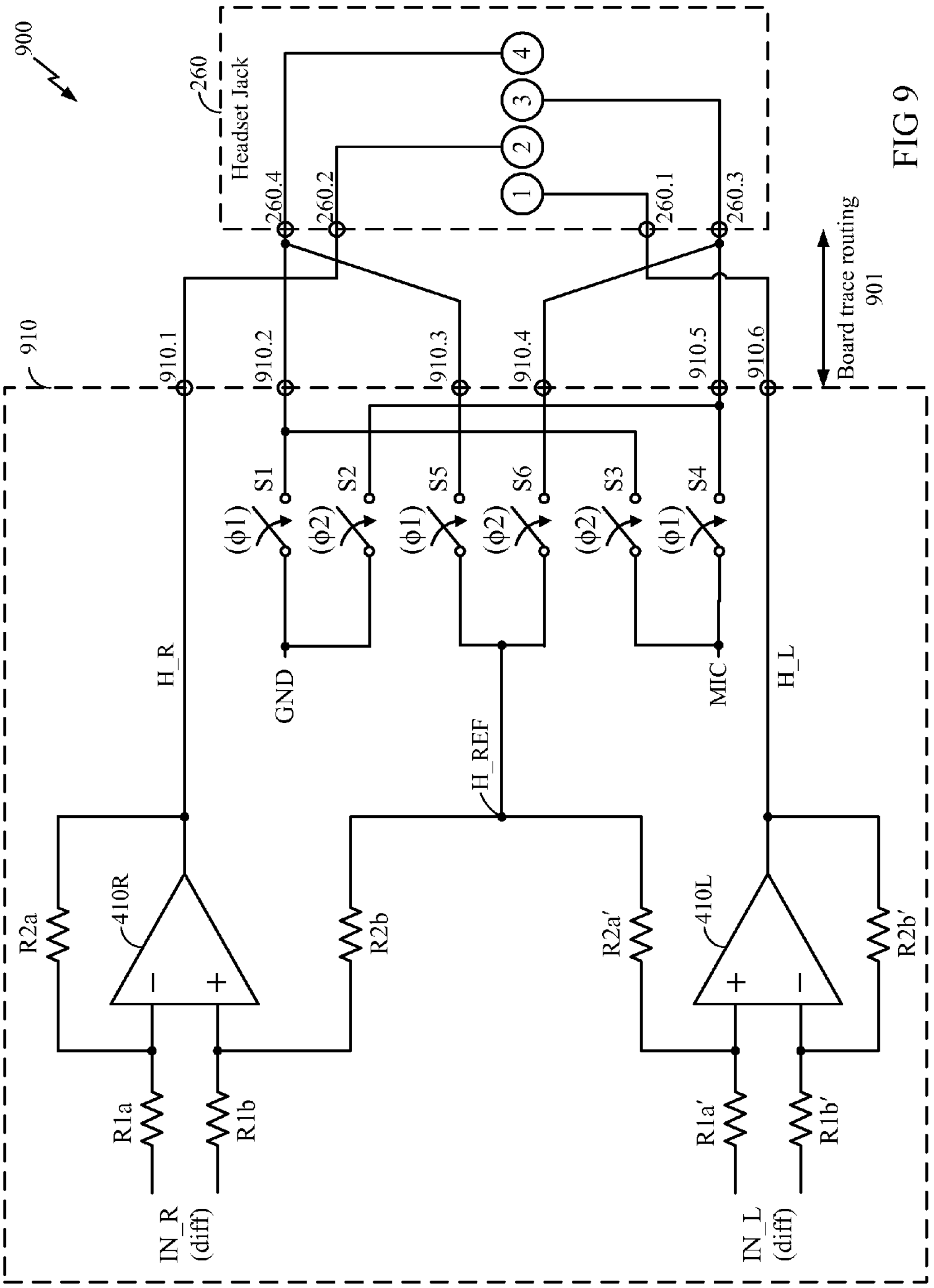
FIG. 9 illustrates an alternative exemplary embodiment of the present disclosure, wherein the six switches S1-S6 are provided on a single integrated circuit, on which the audio amplifiers are also provided.

FIG. 9 illustrates an alternative exemplary embodiment of the present disclosure, wherein the six switches S1-S6 are provided on a single integrated circuit, on which the audio amplifiers are also provided. In FIG. 9, an integrated circuit 910 includes all of switches S1-S6, as well as amplifiers 410R, 410L, and associated resistances. In an exemplary embodiment, it will be appreciated that the integrated circuit 910 may include further features, e.g., audio codec functionality and other control functionality.

In FIG. 9, the integrated circuit 910 includes six physical (package) pins 910.1, 910.2, 910.3, 910.4, 910.5, and 910.6 for interfacing with other board-level components. For example, these pins may be routed to physical terminals 260.1, 260.2, 260.3, 260.4 of the jack 260 using board trace routing 901. Pins 910.1 and 910.6 are used for delivery of the audio signals H_R and H_L, respectively, to physical terminals 260.2, 260.1 of the jack 260. Pins 910.2, 910.3, 910.4, 910.5 are coupled to terminals 260.4 and 260.3.

As noted hereinabove with reference to FIG. 8, in an exemplary embodiment, the electrical connection between 910.3 and 260.4 may be provided as close to 260.4 as possible, i.e., in close physical proximity to the jack 260. Similarly, the output of pin 910.4 is electrically coupled to physical terminal 260.3 of the jack 260, and the electrical connection between 910.4 and 260.3 may be provided as close to 260.3 as possible. In this manner, the aforementioned independence between the ground path and the H-REF path to the jack is advantageously maintained in the case where the switches are integrated with the codec.

Figure 10:
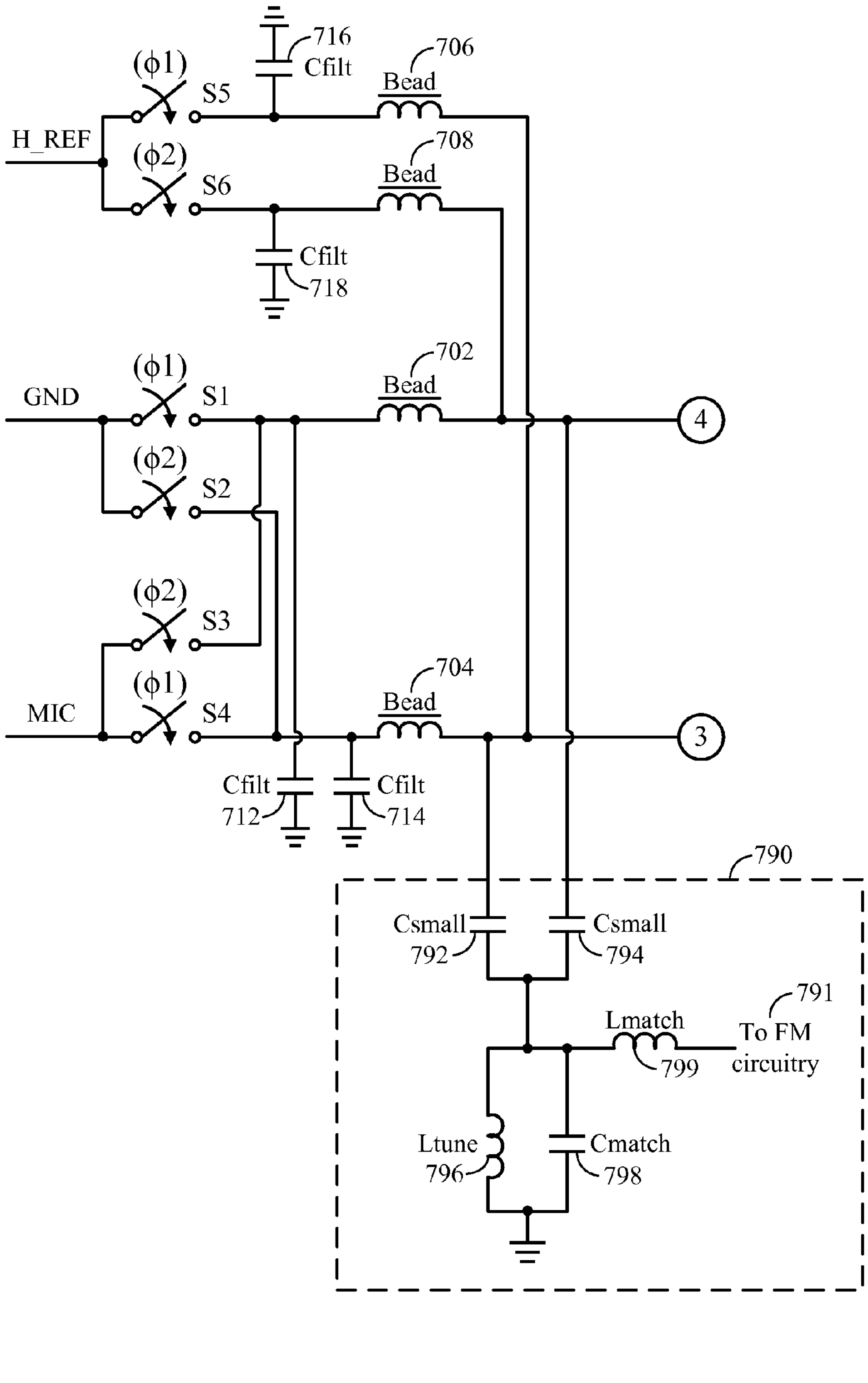
FIG. 10 illustrates an exemplary embodiment according to the present disclosure for supporting both an FM antenna and North American/European-type headset compatibility.

FIG. 10 illustrates an exemplary embodiment according to the present disclosure for supporting both an FM antenna and North American/European-type headset compatibility. Per either the Φ1 or Φ2 configuration, GND and MIC are selectively coupled to terminals 4 and 3 of the jack via ferrite beads 702, 704 and filtering capacitors 712, 714, as shown in FIG. 7. In FIG. 10, H_REF is further shown selectively coupled to either terminal 4 or 3 via ferrite bead 706 or 708, and filtering capacitor 716 or 718. In an exemplary embodiment, the values of the ferrite beads and filtering capacitors may be chosen to isolate GND, MIC, and H_REF from other portions of the circuitry at certain frequencies, e.g., to isolate such nodes from an FM antenna/receiver module 790 as further described hereinbelow.

In particular, the FM module 790 includes capacitors (Csmall) 792, 794 coupling nodes 3 and 4 of the jack to an inductor (Ltune) 796, a capacitor (Cmatch) 798, and another inductor (Lmatch) 799 as shown. Lmatch 799 may be coupled to FM receive processing circuitry (not shown in FIG. 10) to, e.g., process an FM radio signal as received over the air via the conducting wires 245 of the headset 210. It will be appreciated that in this case, the conducting wires 245 (in particular, the wires of the headset making electrical contact with terminals 3 and 4 of the jack) may act as antenna elements to receive over-the-air FM signals. As the frequency range of such FM signals is different from the frequency range of the audio signals H_R, H_L, and MIC, the FM signals will be effectively frequency multiplexed with the audio signals over the conducting wires 245.

In the manner shown in FIG. 10, the six-switch crosstalk reduction techniques of the present disclosure may advantageously be combined with techniques to receive an FM signal using the wires 245 of the headset. In particular, the ferrite beads and capacitors may be provided as filtering elements to protect the codec chip (e.g., the circuitry for processing H_R, H_L, H_REF, and MIC) from, e.g., RF inter-modulation. The filtering elements may further protect the FM processing circuitry 791 from RF spurs arising from the codec chip. It will be appreciated that one of ordinary skill in the art may readily modify the configuration shown in FIG. 10 to, e.g., add or remove filtering elements to design a filter having different characteristics, and such alternative exemplary embodiments are contemplated to be within the scope of the present disclosure.

In an exemplary embodiment, all the switches S1-S6 shown in FIG. 10, along with the passive components including inductors and capacitors, may be provided externally to the codec integrated circuit. Furthermore, in alternative exemplary embodiments, the two ferrite beads 702, 704 and filtering capacitors 712, 714 may be removed to reduce the external component count, at the cost of potentially degraded crosstalk performance.

Figure 11:
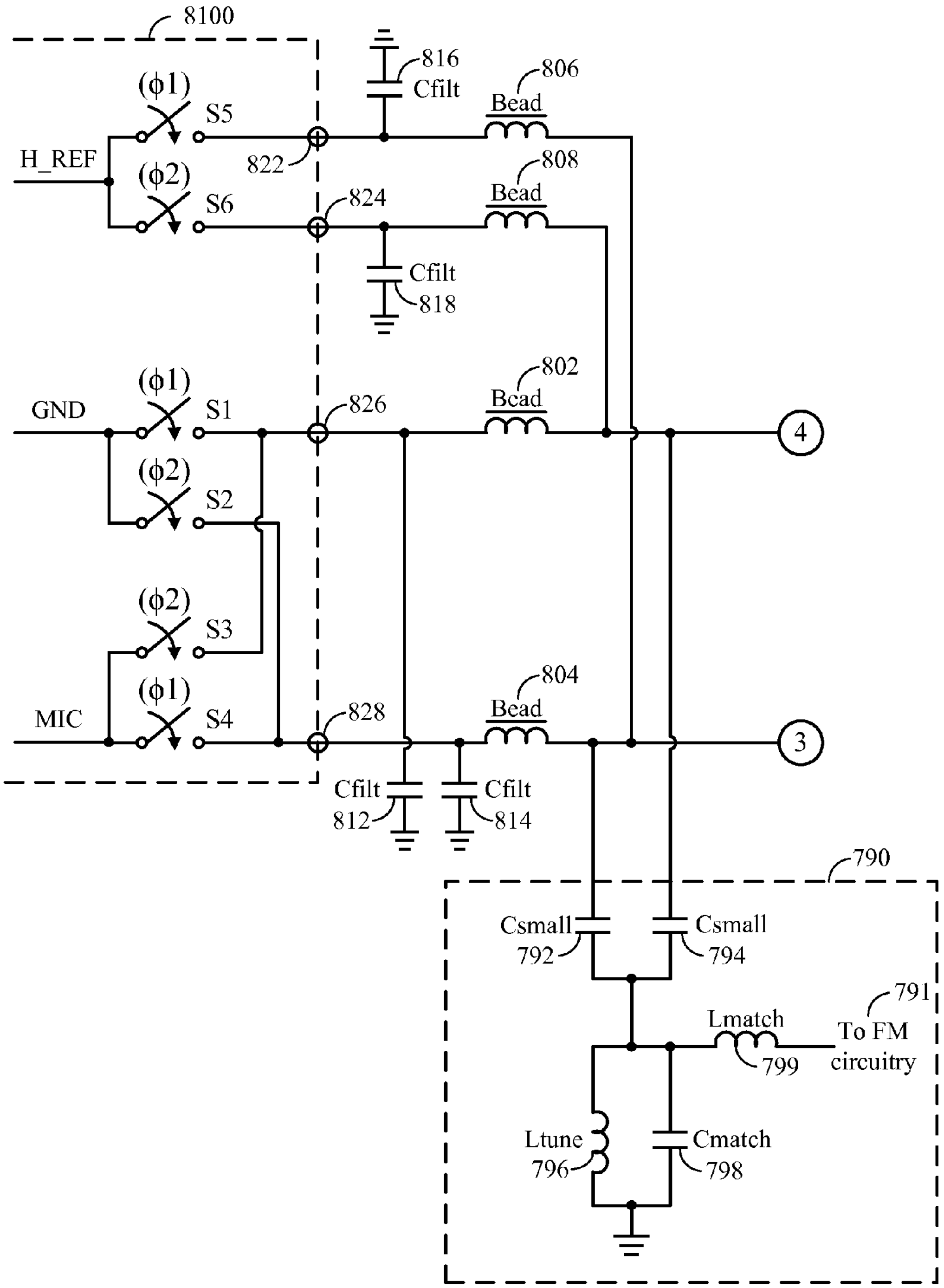
FIG. 11 illustrates an alternative exemplary embodiment for supporting an FM antenna with North American/European-type headset compatibility, wherein the plurality of switches S1-S6 is integrated on a single chip with the codec.

FIG. 11 illustrates an alternative exemplary embodiment, wherein the plurality of switches S1-S6 is integrated on a single chip with the codec. In FIG. 11, elements enclosed by the edges of the dashed box 8100 may correspond to elements found on the codec integrated circuit, while other elements not enclosed by 8100 may be provided externally to the integrated circuit. In FIG. 11, a plurality of pins 822, 824 is provided to couple the outputs of switches S5 and S6 from the integrated circuit to the corresponding passive elements and terminals of the jack, independently of the pins 826, 828 dedicated to the other switches S1 through S4. It will be appreciated that by providing the pins 826, 828 separately from pins 822, 824, the H_REF node will not share the same off-chip routing path with the codec system ground node, thereby advantageously reducing any further crosstalk associated with having these nodes share the same off-chip routing path. It will be appreciated that the parasitic resistance from any external inductor (or beads) can be treated as part of the RG and RF in the equivalent circuit, and thus Equation (2) also applies in this case.

As described earlier hereinabove with reference to FIG. 10, the ferrite beads 802, 804 and filtering capacitors 812, 814 may also be made optional in certain exemplary embodiments.

Figure 12:
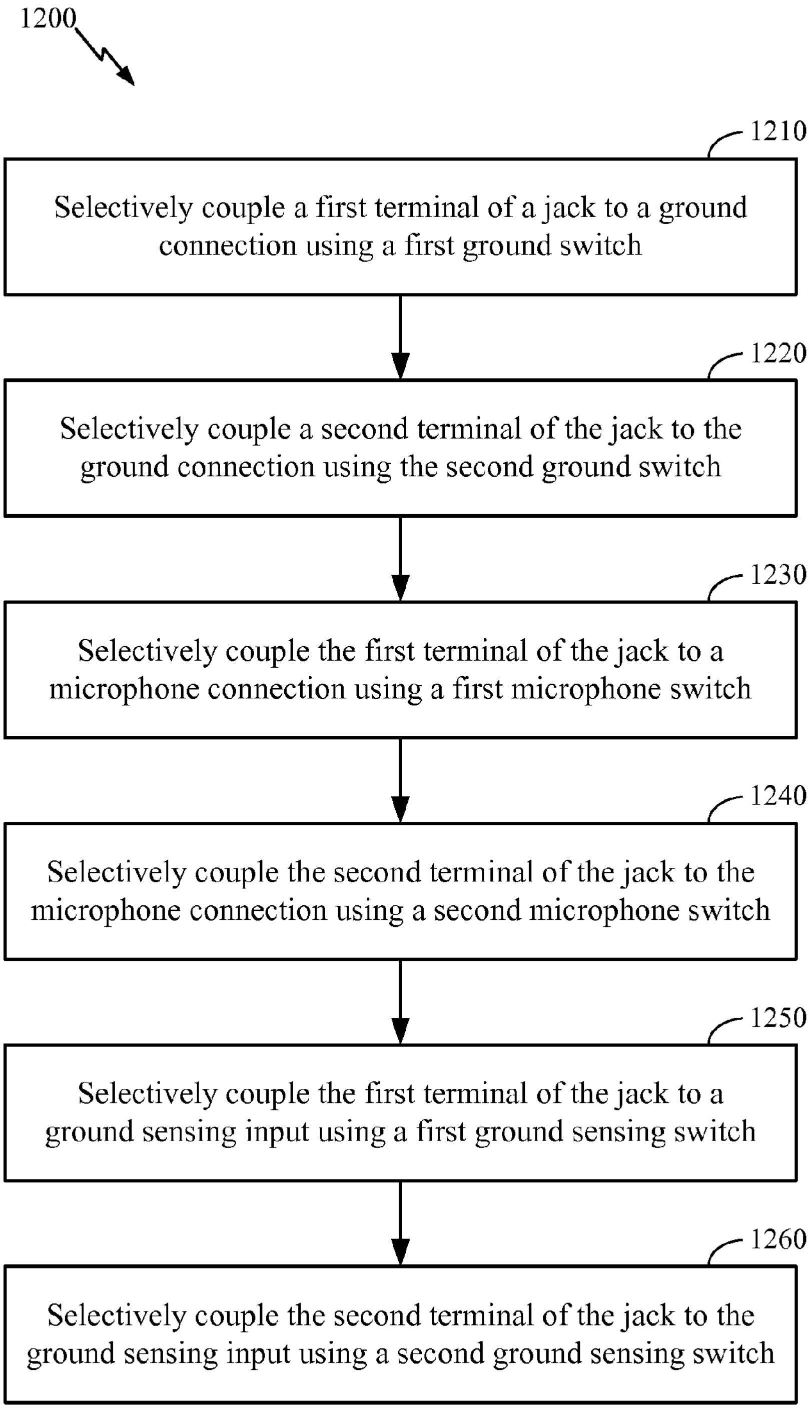
FIG. 12 illustrates an exemplary embodiment of a method according to the present disclosure.

FIG. 12 illustrates an exemplary embodiment of a method according to the present disclosure. Note FIG. 12 is described for illustrative purposes only, and is not meant to limit the scope of the present disclosure to any particular method described herein.

In FIG. 12, at block 1210, a first terminal of a jack is selectively coupled to a ground connection using a first ground switch.

At block 1220, a second terminal of the jack is selectively coupled to the ground connection using the second ground switch.

At block 1230, the first terminal of the jack is selectively coupled to a microphone node using a first microphone switch.

At block 1240, the second terminal of the jack is selectively coupled to the microphone node using a second microphone switch.

At block 1250, the first terminal of the jack is selectively coupled to a ground sensing input using a first ground sensing switch.

At block 1260, the second terminal of the jack is selectively coupled to the ground sensing input using a second ground sensing switch. In an exemplary embodiment, the switches are selectively coupled depending on whether the jack is detected to be of a North American or a European type.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance, or an electrical short circuit, is present between such elements, while when an element is referred to as being simply "coupled" to another element, there may or may not be a path of low resistance between such elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. An apparatus comprising:

a first ground switch configured to selectively couple a first terminal of a jack to a ground connection;

a second ground switch configured to selectively couple a second terminal of the jack to the ground connection;

a first microphone switch configured to selectively couple the first terminal of the jack to a microphone node;

a second microphone switch configured to selectively couple the second terminal of the jack to the microphone node;

a first ground sensing switch configured to selectively couple the first terminal of the jack to a ground sensing input; and a second ground sensing switch configured to selectively couple the second terminal of the jack to the ground sensing input; wherein the switches are configured depending on whether the jack is detected to be of a North American or a European type.

2. The apparatus of claim 1, wherein the six switches are provided on a single integrated circuit, the single integrated circuit comprising:

a first physical pin coupled to an output of the first ground switch and an output of the first microphone switch;

a second physical pin coupled to an output of the second ground switch and an output of the second microphone switch;

a third physical pin coupled to an output of the first ground sensing switch; and a fourth physical pin coupled to an output of the second ground sensing switch.

3. The apparatus of claim 2, further comprising a board for housing the switches, pins, and jack, wherein a fifth physical pin is electrically coupled to the first terminal of the jack at a point adjacent to the jack, and a sixth physical pin is electrically coupled to the second terminal of the jack at a point adjacent to the jack.

4. The apparatus of claim 2, wherein the single integrated circuit further comprises an audio codec.

5. The apparatus of claim 1, wherein the six switches are provided separately from an integrated circuit housing an audio codec, the apparatus further comprising:

a first physical pin coupled to an output of the first ground switch;

a second physical pin coupled to an output of the first microphone switch;

a third physical pin coupled to an output of the second ground switch;

a fourth physical pin coupled to an output of the second microphone switch;

a fifth physical pin coupled to an output of the first ground sensing switch; and a sixth physical pin coupled to an output of the second ground sensing switch;

wherein the first and second physical pins are electrically coupled to each other, and the third and fourth physical pins are electrically coupled to each other.

6. The apparatus of claim 5, further comprising a board for housing the switches, pins, and jack, wherein the fifth physical pin is electrically coupled to the first terminal of the jack at a point adjacent to the jack, and the sixth physical pin is electrically coupled to the second terminal of the jack at a point adjacent to the jack.

7. The apparatus of claim 1, further comprising left and right audio channel amplifiers each comprising:

a differential amplifier having positive and negative inputs and an output;

a first resistor coupled to the negative input;

a second resistor coupled to the positive input;

a third resistor coupling the output to the negative input; and a fourth resistor coupling the positive input to the ground sensing input.

8. The apparatus of claim 7, wherein:

the first ground sensing switch is coupled to the first terminal of the jack via a first inductor, and a first capacitor further couples a connection between the first inductor and the first ground sensing switch to ground; and the second ground sensing switch is coupled to the second terminal of the jack via a second inductor, and a second capacitor further couples a connection between the second inductor and the second ground sensing switch to ground.

9. The apparatus of claim 8, wherein the plurality of switches is integrated on a single chip, the single chip further comprising circuitry for the left and right audio channel amplifiers.

10. The apparatus of claim 8, wherein the left and right audio channel amplifiers are provided on an integrated circuit, and the plurality of switches is provided separately from the integrated circuit.

11. The apparatus of claim 8, wherein the first and second inductors comprise ferrite beads.

12. The apparatus of claim 8, further comprising FM radio processing circuitry coupled to the first and second terminals of the jack.

13. An apparatus comprising:

a first ground switch configured to selectively couple a first terminal of a jack to a ground connection;

a second ground switch configured to selectively couple a second terminal of the jack to the ground connection;

a first microphone switch configured to selectively couple the first terminal of the jack to a microphone node;

a second microphone switch configured to selectively couple the second terminal of the jack to the microphone node; and means for selectively coupling either the first or second terminal of the jack to a ground sensing input based on whether the jack is detected to be of a North American or a European type.

14. The apparatus of claim 13, the means for selectively coupling comprising:

a first inductor coupling a first ground sensing switch to the first terminal of the jack; and a second inductor coupling a second ground sensing switch to the second terminal of the jack.

15. The apparatus of claim 13, further comprising means for driving left and right audio terminals of the jack.

16. The apparatus of claim 13, wherein the switches and means for selectively coupling are provided on a single integrated circuit, the single integrated circuit further comprising:

means for coupling an output of the first ground switch and an output of the first microphone switch; and means for coupling an output of the second ground switch and an output of the second microphone switch.

17. The apparatus of claim 16, further comprising a board for housing the switches, means for selectively coupling, and means for coupling.

18. A method comprising:

selectively coupling a first terminal of a jack to a ground connection using a first ground switch;

selectively coupling a second terminal of the jack to the ground connection using a second ground switch;

selectively coupling the first terminal of the jack to a microphone connection using a first microphone switch;

selectively coupling the second terminal of the jack to the microphone node using a second microphone switch;

selectively coupling the first terminal of the jack to a ground sensing input using a first ground sensing switch; and selectively coupling the second terminal of the jack to the ground sensing input using a second ground sensing switch; wherein the switches are selectively coupled depending on whether the jack is detected to be of a North American or a European type.

19. The method of claim 18, further comprising:

coupling the first ground sensing switch to the first terminal of the jack using a first inductor;

coupling a connection between the first inductor and the first ground sensing switch to ground using a first capacitor;

coupling the second ground sensing switch to the second terminal of the jack using a second inductor; and coupling a connection between the second inductor and the second ground sensing switch to ground.

20. The method of claim 18, wherein the plurality of switches is integrated on a single chip, the single chip further comprising circuitry for the left and right audio channel amplifiers.

* * * * *